US012094375B2

(12) United States Patent
Lawley

(10) Patent No.: US 12,094,375 B2
(45) Date of Patent: Sep. 17, 2024

(54) FACE COVER FOR A DISPLAY MODULE

(71) Applicant: Daktronics, Inc., Brookings, SD (US)

(72) Inventor: Kenneth Parker Lawley, Moorhead, MN (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 18/458,663

(22) Filed: Aug. 30, 2023

(65) Prior Publication Data

US 2024/0062686 A1   Feb. 22, 2024

Related U.S. Application Data

(63) Continuation of application No. 17/892,675, filed on Aug. 22, 2022, now Pat. No. 11,783,735, which is a continuation of application No. 16/500,354, filed as application No. PCT/US2018/025699 on Apr. 2, 2018, now Pat. No. 11,450,245.

(60) Provisional application No. 62/480,844, filed on Apr. 3, 2017.

(51) Int. Cl.
*G09F 9/33* (2006.01)
*G06F 3/147* (2006.01)
(52) U.S. Cl.
CPC ............... *G09F 9/33* (2013.01); *G06F 3/147* (2013.01)
(58) Field of Classification Search
CPC ......................................................... G09F 9/33
See application file for complete search history.

(56) References Cited

U.S. PATENT DOCUMENTS 11,450,245 B2   9/2022  Lawley
2011/0299269 A1*  12/2011  Hata ................ F21V 31/04
                                                      156/182

(Continued)

FOREIGN PATENT DOCUMENTS

AU   2018249487 B2   5/2021
CN      201209781 Y   3/2009

(Continued)

OTHER PUBLICATIONS

"U.S. Appl. No. 16/500,354, Corrected Notice of Allowability mailed Jun. 7, 2022", 6 pgs.

(Continued)

*Primary Examiner* — Shivang I Patel
(74) *Attorney, Agent, or Firm* — Schwegman Lundberg & Woessner, P.A.

(57) ABSTRACT

A display module comprises light-emitting elements coupled to one or more mounting structures and grouped into a pixels in a pixel array on a display face to display textual, graphical, or video information, with each pixel comprising a grouping of one or more light-emitting elements. A face cover is mounted to the mounting structure and is positioned in front of at least a portion of the display face. The face cover comprises a plurality of moguls arranged in a mogul array with each mogul positioned in front of and proximate to a corresponding one of the pixels so that the mogul covers at least a portion of the corresponding pixel, and one or more light-emitting openings in each mogul, each positioned relative to one or more corresponding light-emitting element of the pixel to permit light emitted from the corresponding one or more light-emitting elements to pass through the mogul.

20 Claims, 10 Drawing Sheets

(56) References Cited

U.S. PATENT DOCUMENTS

| | | | |
|---|---|---|---|
| 2014/0268738 A1* | 9/2014 | Chan | H01L 27/156 |
| | | | 29/428 |
| 2021/0287577 A1 | 9/2021 | Lawley | |
| 2023/0045542 A1 | 2/2023 | Lawley | |

FOREIGN PATENT DOCUMENTS

| | | | |
|---|---|---|---|
| DE | 202017101267 U1 | | 3/2017 |
| EP | 3373278 A1 | * | 9/2018 |
| KR | 200463264 Y1 | | 10/2012 |
| KR | 10200463264 Y1 | | 10/2012 |
| WO | WO-2018187214 A1 | | 10/2018 |

OTHER PUBLICATIONS

"U.S. Appl. No. 16/500,354, Non Final Office Action mailed Dec. 17, 2021", 17 pgs.

"U.S. Appl. No. 16/500,354, Notice of Allowance mailed May 12, 2022", 8 pgs.

"U.S. Appl. No. 16/500,354, Preliminary Amendment filed Oct. 2, 2019", 8 pgs.

"U.S. Appl. No. 16/500,354, Response filed Mar. 14, 2022 to Non Final Office Action mailed Dec. 17, 2021", 20 pgs.

"U.S. Appl. No. 17/892,675, Notice of Allowance mailed May 30, 2023", 9 pgs.

"U.S. Appl. No. 17/892,675, Preliminary Amendment filed Oct. 11, 2022", 7 pgs.

"Australian Application Serial No. 2018249487, First Examination Report mailed Aug. 25, 2020", 4 pgs.

"Australian Application Serial No. 2018249487, Response filed Dec. 22, 2020 to First Examination Report mailed Aug. 25, 2020", 15 pgs.

"European Application Serial No. 18719023.6, Communication Pursuant to Article 94(3) EPC mailed Apr. 29, 2021", 8 pgs.

"European Application Serial No. 18719023.6, Response filed Apr. 6, 2020 to Communication pursuant to Rules 161(2) and 162 EPC mailed Sep. 19, 2019", 23 pgs.

"European Application Serial No. 18719023.6, Response filed Jul. 21, 2021 to Communication Pursuant to Article 94(3) EPC mailed Apr. 29, 2021", 14 pgs.

"International Application Serial No. PCT/US2018/025699, International Preliminary Report on Patentability mailed Oct. 17, 2019", 11 pgs.

"International Application Serial No. PCT/US2018/025699, International Search Report mailed Jun. 20, 2018", 6 pgs.

"International Application Serial No. PCT/US2018/025699, Written Opinion mailed Jun. 20, 2018", 9 pgs.

* cited by examiner

FACE COVER FOR A DISPLAY MODULE

CLAIM OF PRIORITY

This application is a continuation of U.S. patent application Ser. No. 17/892,675, filed on Aug. 22, 2022, which application is a continuation of U.S. patent application Ser. No. 16/500,354, filed on Oct. 2, 2019, which application is a U.S. National Stage Filing under 35 U.S.C. 371 from International Application No. PCT/US2018/025699, filed on Apr. 2, 2018, and published as WO 2018/187214 on Oct. 11, 2018, which application claims the benefit of priority of U.S. Provisional Application Ser. No. 62/480,844, filed on Apr. 3, 2017, which applications are incorporated by reference herein in their entireties.

BACKGROUND

Displays comprising a plurality of light-emitting elements (such as light-emitting diodes, or "LEDs") are used for the display of Information. For example, dynamic message displays can comprise an array of light-emitting elements configured to display information. In some examples, individual displays are formed from a plurality of smaller display modules that are operated together to form a larger display.

SUMMARY

The present disclosure describes a face covering structure for a display module. The face covering structure (also referred to as the Face cover) provides shading of the light-emitting elements of the display module, similar to louver blades in conventional displays. The Face cover also provides enhanced impact protection and improved contrast. In some examples, the Face cover can allow the overall display to meet industry standards corresponding to the application of the display (e.g., transportation standards if the display is being used as a transportation information sign) with respect to impact resistance and contrast in a single simple structure that does not require secondary optics or many of the other more complicated solutions that have been used in displays.

The present disclosure describes a display module that includes a plurality of light-emitting elements and supporting electronics coupled to one or more mounting structures. The plurality of light-emitting elements are grouped into a plurality of pixels each comprising a grouping of one or more of the plurality of light-emitting elements, the pixels arranged in a pixel array on a display face to display one or more of textual, graphical, or video information. The display module also includes a face cover mounted to the one or more mounting structures and positioned in front of at least a portion of the display face. The face cover includes a plurality of moguls arranged in a mogul array, wherein each mogul is positioned in front of and proximate to a corresponding one of the plurality of pixels so that the mogul covers at least a portion of the corresponding one of the plurality of pixels, and a set of one or more light-emitting openings in each mogul, each positioned relative to a corresponding one or more of the light-emitting elements to permit light emitted from the corresponding one or more of the light-emitting elements to pass through the mogul.

BRIEF DESCRIPTION OF THE FIGURES

In the drawings, which are not necessarily drawn to scale, like numerals may describe similar components in different views. Like numerals having different letter suffixes may represent different instances of similar components. The drawings Illustrate generally, by way of example, but not by way of limitation, various embodiments discussed in the present document.

DETAILED DESCRIPTION

Figure 1:
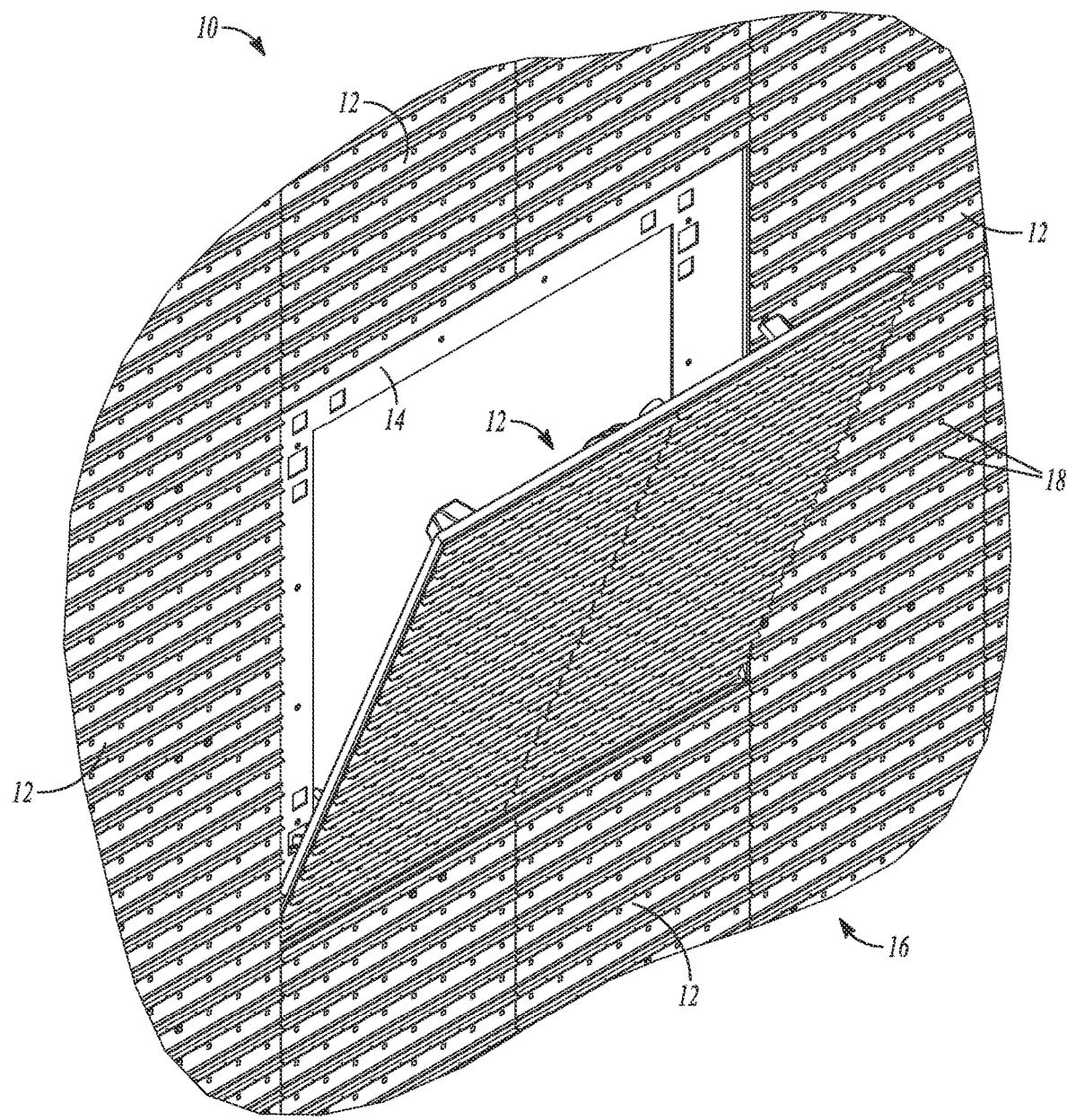
FIG. 1 is a partial perspective view of an example light-emitting display comprising a plurality of individual display modules that are operated in a cooperative manner to display information on the light-emitting display.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present Invention. While the disclosed subject matter will be described in conjunction with the enumerated claims, it will be understood that the exemplified subject matter is not Intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., Indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be Interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

FIG. 1 shows an example of an Information display 10 (also referred to simply as "display 10") that is configured to display one or more of video, graphical, or textual Information. The display 10 includes a plurality of Individual display modules 12 mounted to one or more supports 14, such as a support chassis or a frame. The plurality of display modules 12 are operable together so that the overall display 10 appears as a single, larger display. FIG. 1 shows one of the display modules 12 being in a tilted position relative to the support 14, which can occur when that display module 12 is in the process of being mounted to, or dismounted from, the support 14. The other display modules 12 in the display 10 are mounted to the support 14.

The display 10 can Include a display surface 16 configured to display the video, graphical, or textual information from the display 10. A plurality of light-emitting elements 18 are mounted to the display surface 16. For example, the plurality of light-emitting elements can be mounted to one or more mounting structures, such as one or more of a circuit board, potting, or a module frame of a corresponding display module 12. The light-emitting elements 18 are operated together to display the video, graphical, or textual information on the display 10.

The light-emitting elements 18 can be any type of light-emitting technology known or yet to be discovered for the emission of light from a small area, particularly for light-emitting technology that is or can be used display of visual information, such as video, graphical, or textual Information. At the time or filing of the present application, light-emitting diodes (LEDs) are one of the most common light-emitting technologies in use for video or graphical displays of the type described herein. As such, for the sake of brevity, the remainder of the present disclosure will refer to light-emitting elements that can be used in a display (including the light-emitting elements 18 of FIGS. 1 and 2 and those described in FIGS. 3-9) will be referred to as LEDs. However, those of skill in the art will appreciate that any time the present disclosure uses the term light-emitting diode "or LED," that light-emitting devices other than LEDs can be used, including, but not limited to, liquid crystal display devices (LCDs), organic light-emitting diodes (OLEDs), organic light-emitting transistors (OLETs), surface-conduction electron-emitter display devices (SEDs), field-emission display devices (FEDs), laser TV quantum dot liquid crystal display devices (QD-LCDs), quantum dot light-emitting diode display devices (QD-LEDs), ferro-liquid display devices (FLDs), and thick-film dielectric electroluminescent devices (TDELs).

Figure 2:
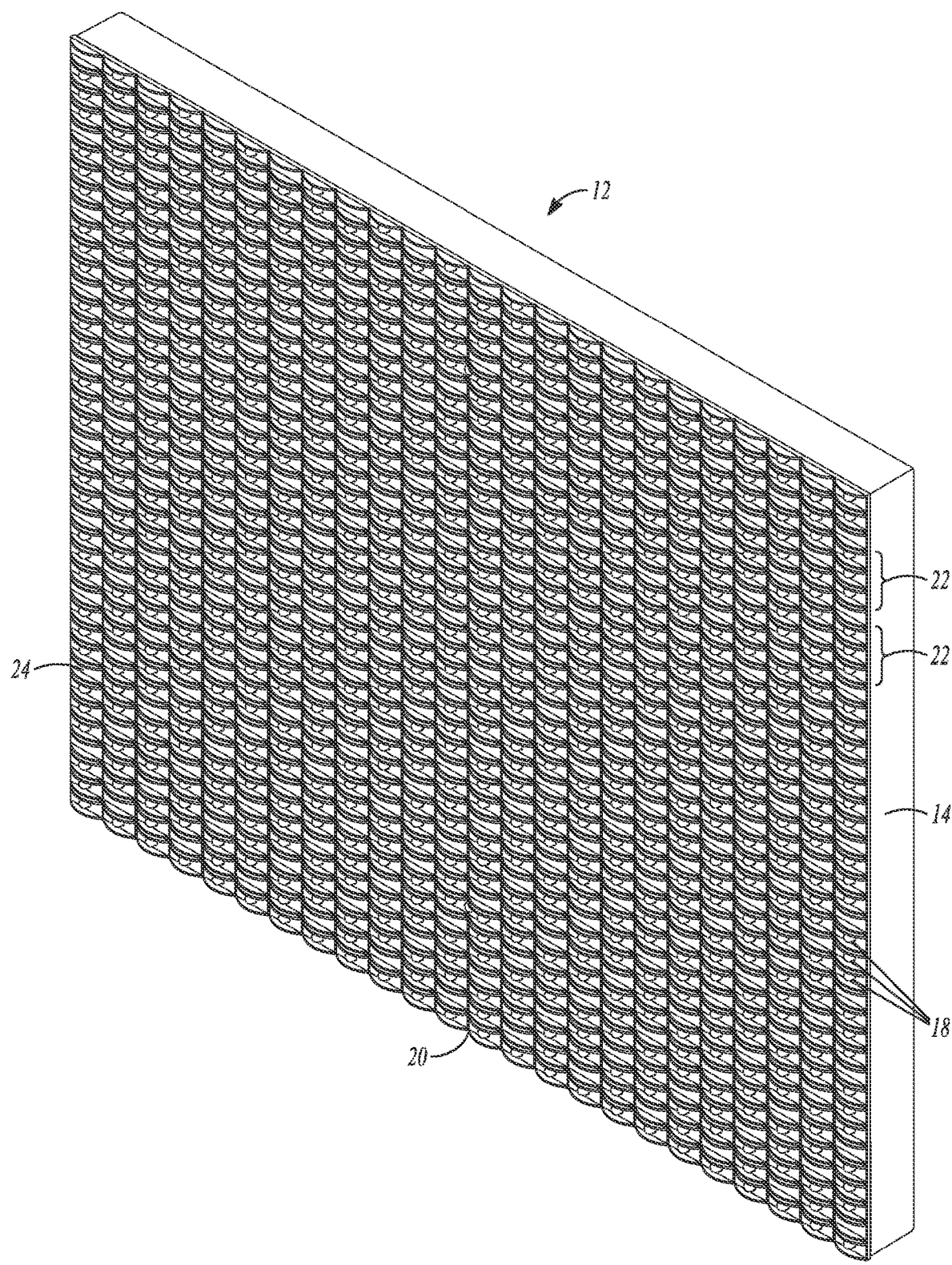
FIG. 2 is a perspective view of an example light-emitting display module, which can be used as one of the individual display modules in the light-emitting display of FIG. 1.

FIG. 2 is a perspective view of an example display module 12 that can be used in the display 10 of FIG. 1. The display module 12 includes a face 20 configured to provide for a display of graphics or video content. A plurality of the LEDs 18 are positioned on the face 20 and the LEDs 18 can be operated in such a way that the display module 12 will display a portion of the video, graphical, or textual information to be shown on the display 10. The face 20 of the display module 12 is aligned and oriented relative to faces 20 of one or more adjacently-positioned LED modules 12 so that the faces 20 combine to form the display surface 16 of the overall display 10 shown in FIG. 1. The plurality of display modules 12 are operated together in such a way as to display the video, graphical, or textual Information in a cohesive manner so that the entire display 10 appears to a viewer as a single display that is larger than the Individual display modules 12.

In an example, the LEDs 18 are arranged into an array of pixels 22 (best seen in FIG. 2). Each pixel 22 includes one or more LEDs 18 grouped together in close proximity. The proximity of the pixels 22 allows the display 10 to be operated in such a way that they will appear to a viewer of the display 10 to form recognizable shapes, such as letters or numbers to display textual information or recognizable shapes to display graphical or video Information. In some examples, the plurality of LEDs 18 include a plurality of different-colored LEDs 18 such that different-colored LEDs 18 of each pixel 22 can be cooperatively operated to display what appears to be a spectrum of different colors for the viewer of the display 10. In an example, each pixel 22 includes a red LED 18, a green LED 18, and a blue LED 18, wherein the red, green, and blue LEDs of each pixel 22 cooperate to provide essentially the entire color spectrum that is visible to humans based on whether one, two, or all three of the LEDs 18 in a pixel 22 are lit, and at what intensities. The display 10 can also provide a black or empty looking surface over a portion of the display, when desired, by deactivating or turning off the LEDs in a designated area of pixels 22.

In an example, the pixels 22 are arranged in a grid-like array, such as a grid comprising a specified number of rows and a specified number of columns of the pixels 22. The display 10 can be controlled, for example with control software and/or one or more hardware controllers, so that visual Information, e.g., video, graphical, or textual information, is broken down into coordinates. Each coordinate can correspond to a specific pixel location within the overall display 10, and the control software and/or the one or more hardware controllers can operate each pixel according to a program that specifies a condition for each coordinate within the display 10 and controls each of the pixels 22 so that it will appear to emit light that meets the condition specified. For example, if the display 10 is displaying a series of textual messages, the control software and/or the one or more hardware controllers can be fed the data corresponding to the series of textual messages, and the control software and/or the one or more hardware controllers can break the text of the messages down into conditions for each pixel 22, such as the time within the series of messages, the color that a pixel 22 is to display at that time (if the display 10 is a multi-colored display) and the Intensity of the pixel 22 at that time. The control software and/or the one or more hardware controllers can also convert the Information regarding color and intensity into specific operating parameters for each LED 18 in a particular pixel 22, such as the power that will be supplied to the red LED 18, the blue LED 18, and the green LED 18 in that pixel 22 and for how long in order to achieve the specified color and intensity at the specified time. The control software and/or the one or more hardware controllers can then send control signals to the pixels 22 or to individual LEDs 18 that can operate the pixels 22 according to the specified series of textual messages. Although a grid or grid-like array of LED pixels, as summarized above, is common, the display 10 described herein can use other arrangements of the LEDs 18 or other systems for addressing the LEDs 18 can be used without varying from the scope of the present invention.

The display 10 can include a face cover 24 that is placed over a front face of the display 10. The face cover 24 can provide protection for one or more of the LEDs 18, the display surface 16, and the electrical components of the display modules 12 that provide for the operation of the LEDs 12.

Face Cover

FIGS. 3-9 show various views of an example race cover 100 that is placed in front of a display module 102, such as onto a front face 104 of the display module 102. In an example, the display module 102 can be the similar to or the same as the display module 12 shown in FIGS. 1 and 2. For example, the display module 102 includes a plurality of light-emitting elements 106A, 106B, 106C. In some examples, the light-emitting elements 106A, 106B, and 106C are light-emitting diodes ("LEDs"), and will be referred to hereinafter as LEDs 106A, 106B, and 106C (collectively referred to as "LEDs 106" for the sake of brevity). The LEDs 106 are arranged in an array of pixels 108, similar to the description of the pixels 22 of the LEDs 18 for the display module 12 shown in FIGS. 1 and 2. For example, each pixel 108 can include a first LED 106A that primarily emits green-colored light, a second LED 106B that primarily emits red-colored light, and a third LED 106C that primarily emits blue-colored light, also referred to herein as the "green LED 106A," the "red LED 106B," and the "blue LED 106C," for brevity. Those of skill in the art will appreciate that fewer or more than three LEDs 106 can be included in each pixel 108, and that a different combination of colors for the individual LEDs 106 can be used (including monochromatic colors), without varying from the scope of the present disclosure.

In an example, the face cover 100 includes a plurality of moguls 110 that are formed in the face cover 100 in an array, for example in a generally rectangular-grid array comprising a plurality of rows and columns of the moguls 110. In an example, the moguls 110 are arranged in the same pattern of array as the pixels 108 of the LEDs 106, i.e., with the same number of rows and columns of moguls 110 as there are rows and columns of the LED pixels 108. In an example, each mogul 110 is sized and positioned over a corresponding pixel 108 of the LEDs 106. For example, if the display module 102 is configured so that each pixel 108 comprises three LEDs 106 (such as the green, red, and blue LEDs 106A, 106B described above, as is comment in displays of the type described herein), then each mogul 110 is sized and shaped to cover the entirety of al three LEDs 106 of the corresponding pixel 108 associated with that mogul 110.

In an example, the face cover 100 is formed by molding or casting a base polymeric material (such as a polycarbonate) to form the moguls 110 and other potential features described herein for the face cover 100. Other materials can be added to the base polymeric material, including but not limited to: fillers, reinforcement materials, or other additives that are included within the polymeric matrix of the base polymeric material; or a coating added to the front surface of the base polymeric material (i.e., the front face of the face cover 100), such as a paint or other contrast-enhancing coating to improve contrast performance of the display module 102 during operation.

Several specific features of the face cover 100 and their individual advantages will now be described. The face cover 100 can include one or any combination of the following features without varying from the scope of the present disclosure.

Led Shading

In the example shown, the entirety of each LED 106 in a particular pixel 108 is recessed from at least the front surface of the corresponding mogul 110 that covers the pixel 108 in question, as best seen in FIGS. 4, 5, 8, and 9. This can allow the face cover 100 to protect the LEDs 106 from damage if the display module 102 is impacted by a projectile object that strikes the front of the display module 102 because the material of the face cover 100, and particularly the material of the corresponding mogul 110, will absorb the force of the impact rather than the LEDs 106 (as described in more detail below). The face cover 100 can also include other optional features that further protect the LEDs 106 and other components of the display module 102 from impact (as described in more detail below). The mogul 110 can also provide shading to the LEDs 106 from direct sunlight if the display module 102 is one that is used for outdoor applications. Shading can prevent or minimize sunlight glare interference with the projection of a true color appearance from the display, and thus can provide for more accurate representation of graphic, video, or textural information on the display. Shading of the LEDs 106 can also enhance the contrast appearance of the display, for example when a portion of the pixels 108 are to be unlit so as to represent the color black.

The design of the face cover 100 using the moguls 110 to cover and shade the LEDs 106 can allow a display formed from display modules 102 that use the face cover 100 to be made without the use of traditional louvers with louver blades, as has been more typical for shading or LEDs 106 in display modules 102. Without a louver with a louver blade, the display module 102 can be designed with much fewer prominently projecting surfaces upon which snow, dust, or other debris can accumulate to block or distort the images to be displayed by the LEDs 106 or to interfere with operation of the display. The face cover 100 also provides for shading and improved impact protection without the use of secondary optics that cover the LEDs 106 and/or divert light from the LEDs 106. This allows for improved off-state performance and better contrast from the display.

Led Openings

Figure 3:
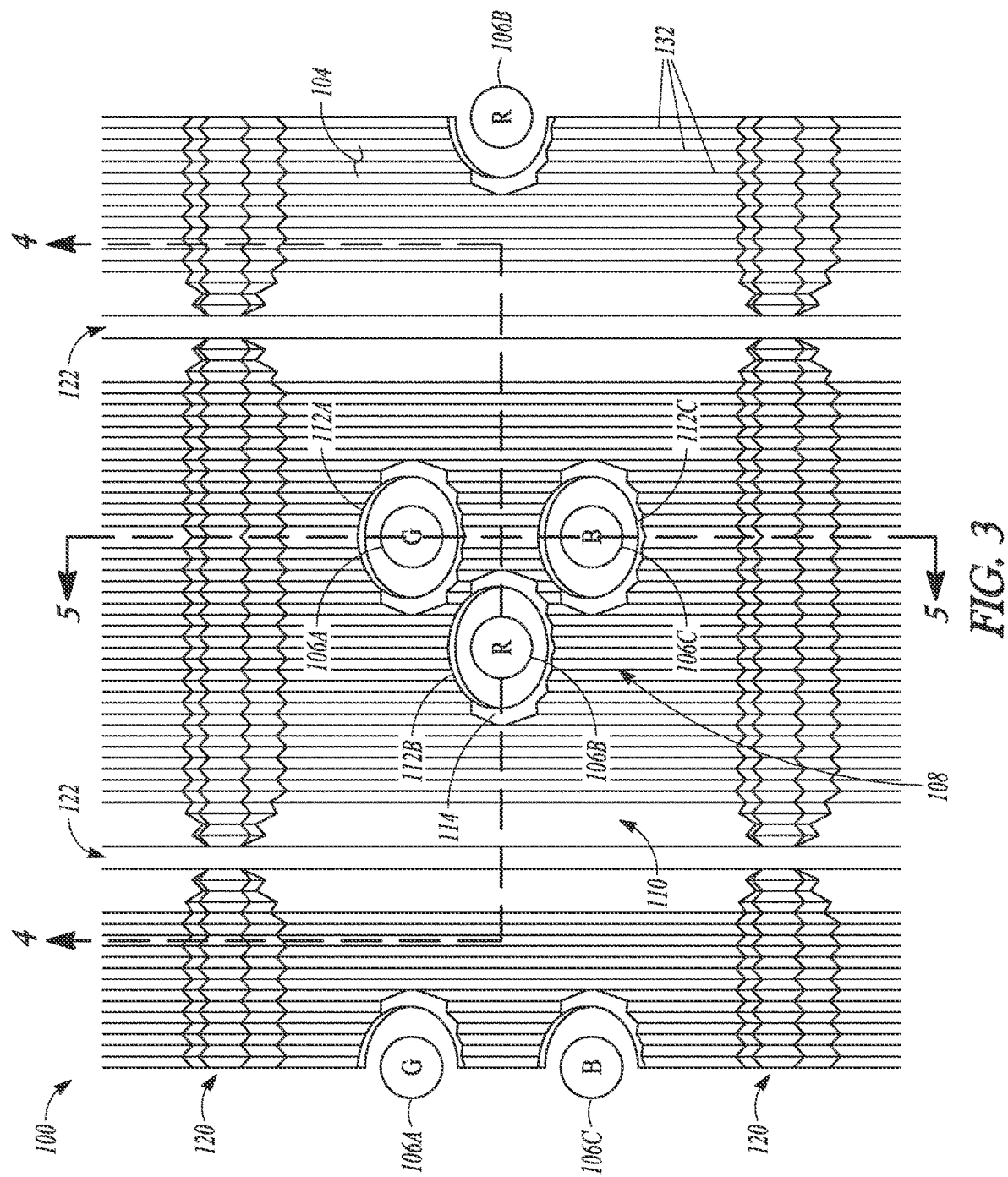
FIG. 3 is a front view of an example face cover for a display module, such as one of the display modules of the display of FIG. 1.

As is best seen in FIGS. 3, 7, 8, and 9, each mogul 110 includes a plurality of LED openings 112A, 112B, and 112C (collectively referred to as "LED openings 112"). In an example, the number of LED openings 112 in each mogul 110 corresponds to the number of LEDs 106 in each pixel 108. For example, as shown in the figures, when each pixel 108 is configured with three LEDs 106, then each mogul 110 can include three LED openings 112, with one LED opening 112 corresponding to each of the plurality of LEDs 106 in each pixel 108 (three in the case of the example shown). In an example, the LED openings 112 are arranged with the same relative positioning in the mogul 110 as the LEDs 106 are arranged in each pixel 108. In an example, the LEDs 106 of each pixel 108 are arranged in a generally triangular configuration, e.g., with each LED 106 being positioned at an apex of a triangle. In the example best seen in FIGS. 3 and 7, the LEDs 106 are arranged with two of the LEDs 106 in the triangle substantially overlapping each other in a first of the major directions of the display module 102, and in some examples completely or nearly completely overlapping in the first major direction, while being spaced apart from each other in a second major direction that is perpendicular to the first major direction, while the remaining one of the three LEDs 106 is spaced from the two aligned LEDs 106 in both the first major direction and the second major direction. For example, as shown in FIG. 3, a first LED 106A (e.g., the top-most LED 106A) and a third LED 106C (e.g., the bottom-most LED 106C) overlap each other completely or substantially completely in the horizontal direction and are spaced apart from each other in the vertical direction, while a second LED 106B (e.g., the vertically middle-most LED 106B) is spaced both horizontally and vertically from both the first LED 106A and the third LED 106C. The first and second major directions (e.g., the horizontal and vertical directions in FIG. 3) correspond to the major areal dimensions of the display module 102 (e.g., the first major direction of the LEDs 106 corresponds to a direction of a width of the display module 102 and the second major direction of the LEDs 106 corresponds to the direction of a height of the display module 102).

In such an example for the configuration of the LEDs 106 in the pixel 108, the LED openings 112 in the mogul 110 can also have a generally triangular configuration, e.g., with a first LED opening 112A at a first apex of the triangular configuration, a second LED opening 112B at a second apex of the triangular configuration, and a third LED opening 112C at a third apex of the triangular configuration. In the example shown in FIGS. 3-9, the first LED opening 112A is proximate to (and in some examples coaxial or substantially coaxial with) the first LED 106A, the second LED opening 112B is proximate to (and in some examples coaxial or substantially coaxial with) the second LED 106B, and the third LED opening 112C is proximate to (and in some examples coaxial or substantially coaxial with) the third LED 106C.

Although the example face cover 100 shown in FIGS. 3-9 includes a separate LED openings 112 corresponding to each LED 106 (e.g., three LED openings 112 per mogul 110 corresponding to the three LEDs 106 per pixel 108), the face cover 100 is not so limited. For example, the face cover 100 can include one larger LED opening per mogul 110 (not shown) (e.g., one LED opening per pixel 108) that is large enough for the light from all of the LEDs 106 in the pixel 108 covered by the mogul 110 to be able to escape through the one large LED opening. Other variations in the LED openings 112 can also be contemplated by those of skill in the art.

Viewing Angle Control

In an example, each LED openings 112 is surrounded by a beveled bore 114 having an areal size, when viewed from the front of the display module 102 that is larger than the areal size of the physical opening of the LED openings 112. For example, if the LEDs 106 and the LED openings 112 have a generally circular cross-section, then the distance across the bore 114 in at least one direction (such as in the horizontal direction or in the vertical direction, or both) is larger than the diameter of the LED openings 112 in the same direction. In some examples, the bevel of the bores 114 around the LED openings 112 can allow the face cover 100 to limit the viewing angle of the light from the LEDs 106, i.e., so that when a viewer of the display is at an angle relative to the display surface of the display that is steeper than the viewing angle, the content being displayed will no longer be viewable. In an example, best seen in FIGS. 4, 7, and 9, the bore 114 around each LED openings 112 can include portions located generally horizontally adjacent to the LED openings 112 (referred to as the "horizontal portion 116 of the bore 114," or simply the "horizontal portion 116") that is angled in the horizontal direction at a horizontal bore angle relative to a central axis of the LED 106 corresponding to the LED opening 112 in question (referred to hereinafter as the "LED axis $A_{LED}$") that is selected to correspond to a desired and specified horizontal viewing angle $\theta_{Horiz}$ for the fight of the LED 106 that corresponds to that LED openings 112. The angled horizontal portion 116 of the bore 114 allows light from the LED 106 that is less than the specified horizontal viewing angle $\theta_{Horiz}$, while light that is outside of the horizontal viewing angle $\theta_{Horiz}$ will be blocked by the material of the face cover 100, as is shown conceptually in FIG. 9.

Figure 5:
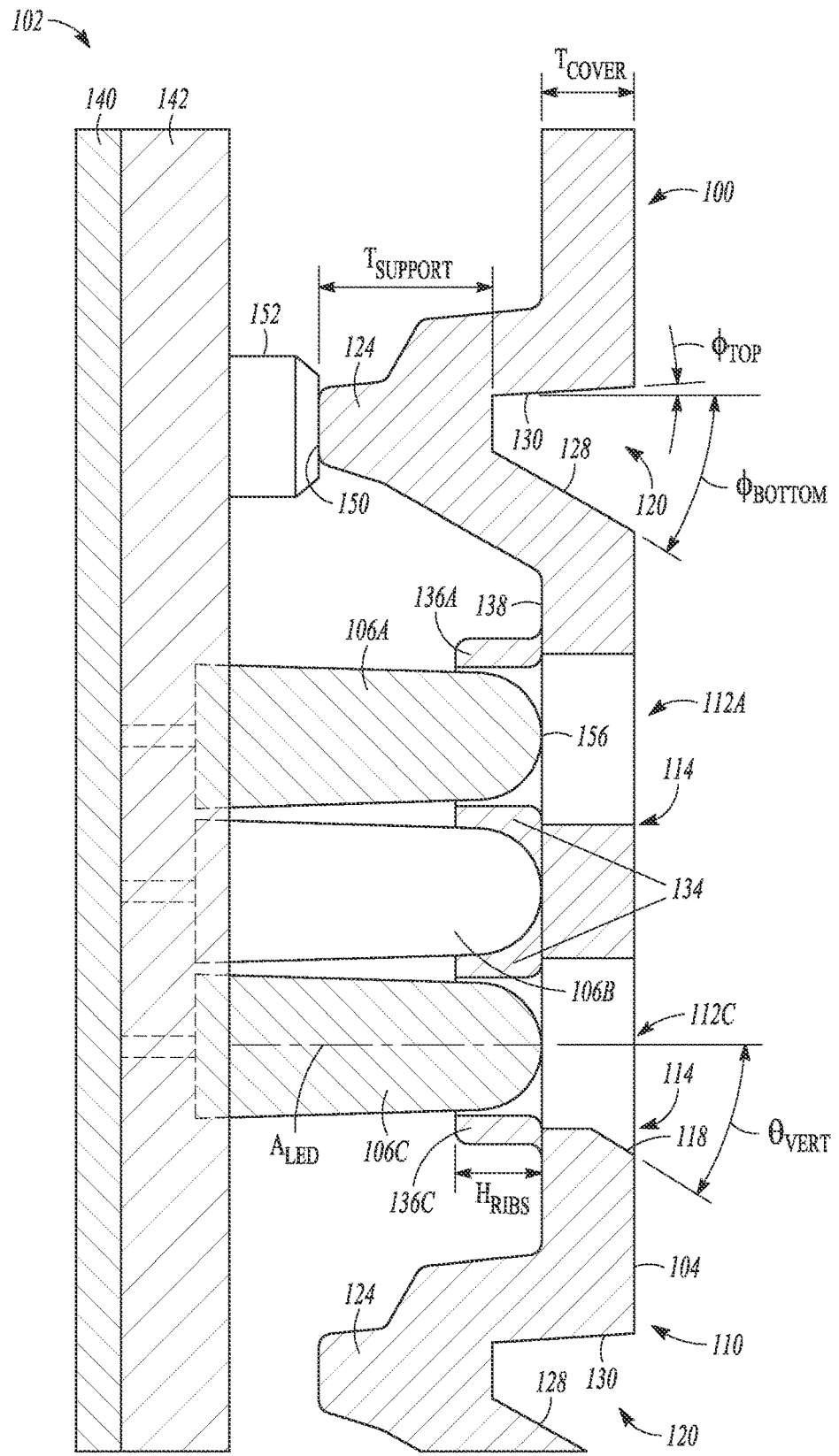
FIG. 5 is a side sectional view of the example face cover taken along line 5-5 in FIG. 3.
Figure 7:
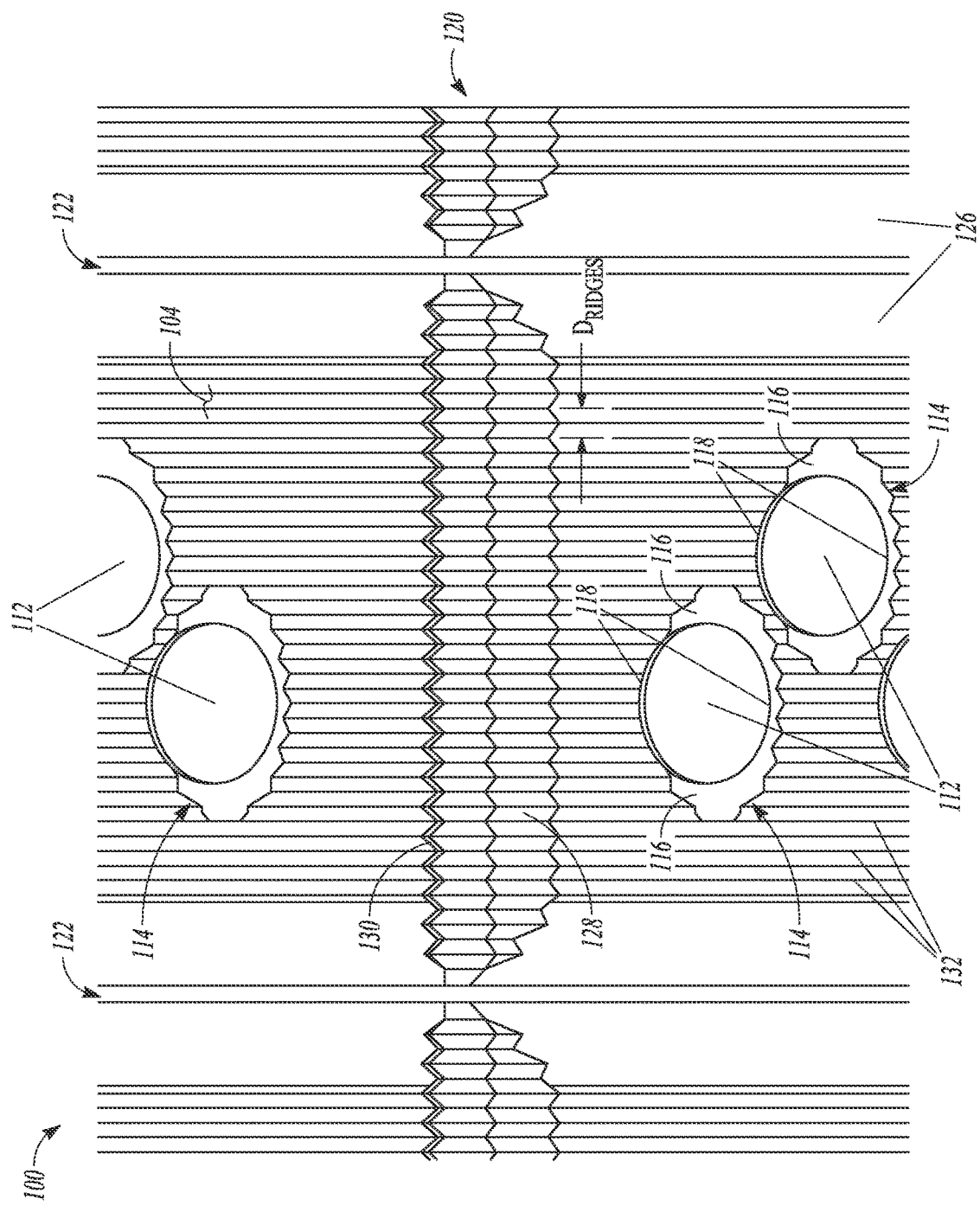
FIG. 7 is another front view or the example face cover of FIG. 3.
Figure 9:
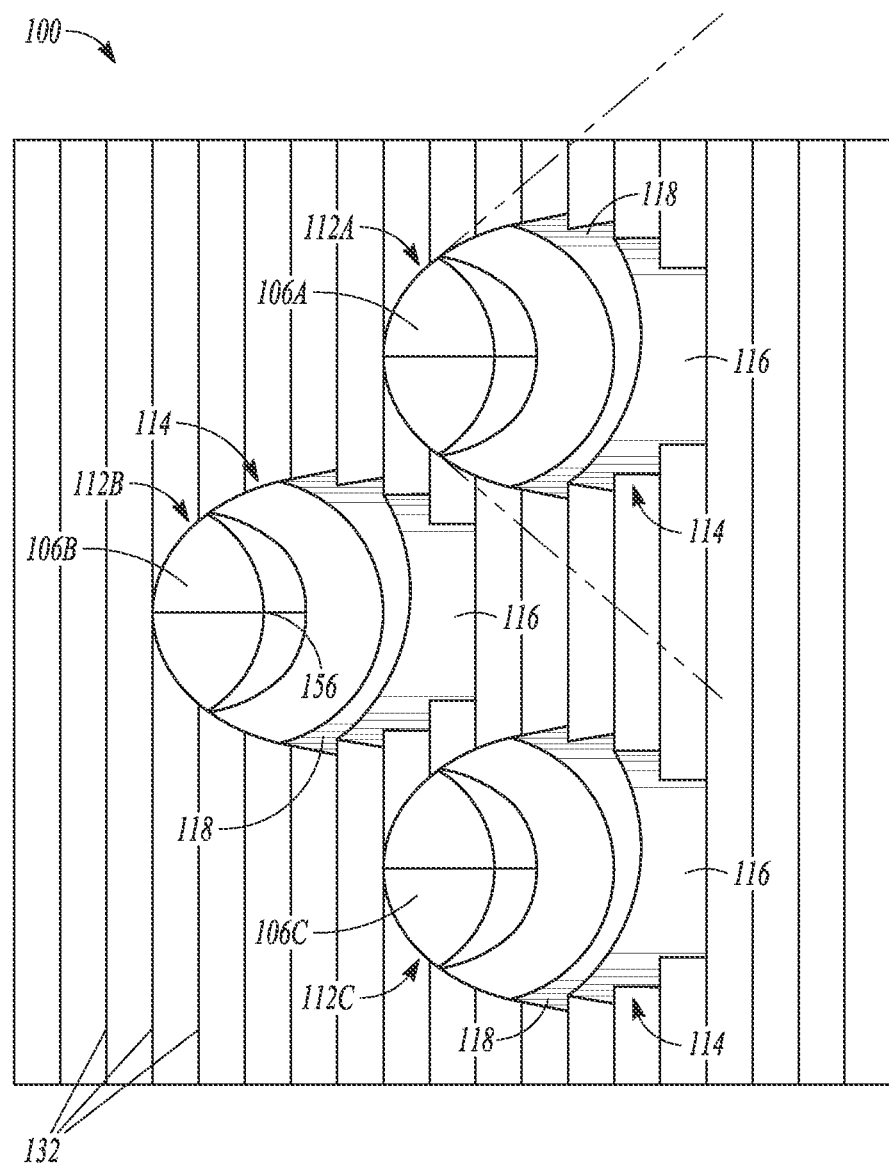
FIG. 9 is a front perspective view of the example display module during operation with the example face cover of FIG. 3.

Similarly, in an example, best seen in FIGS. 5, 7, and 9, the bore 114 around each LED openings 112 can include portions located generally vertically adjacent to the LED openings 112 (referred to as the "vertical portion 118 of the bore 114," or simply the "vertical portion 118") that are angled in the vertical direction at a vertical bore angle relative to the LED axis $A_{LED}$ that is selected to correspond to a desired and specified vertical viewing angle $\theta_{Vert}$ for the light of the LED 106 that corresponds to that LED openings 112. The angled vertical portion 118 of the bore 114 allows light from the LED 106 that is less than the specified vertical viewing angle $\theta_{Vert}$, while light that is outside of the vertical viewing angle $\theta_{Vert}$ will be blocked by the material of the face cover 100, as is shown conceptually in FIG. 9.

In an example, the vertical portion 118 of the bore 114 that controls the vertical viewing angle $\theta_{Vert}$ is only located at a bottom portion of the bore 114, i.e., the bore 114 mainly only limits the vertical viewing angle $\theta_{Vert}$ of light that is projecting in a generally downward direction from the LED 106, while the portion of the bore 114 that is generally vertically above the LED openings 112 does not alter the upward vertical viewing angle as much. One reason for this is the fact that most transportation signs are positioned vertically above the intended viewers (e.g., drivers and passengers in automobiles) and very few are positioned vertically below the intended viewers.

As described above, rather than using a separate LED openings 112 for each LED 106 that is covered by the mogul 110 (i.e., each LED 106 of the pixel 108) a single larger LED openings 112 in each mogul 110 could be used. In such an example, the single larger LED opening could also have a beveled bore similar to the bores 114 around the separate LED openings 112 described above and shown in FIGS. 4, 5, 7, and 9. For example, the single larger LED opening could have a bore with Its own horizontal portion 116 that can control a horizontal viewing angle of the LEDs 106 of the pixel 108 and a vertical portion that can control a vertical viewing angle of the LEDs 106. The only difference is that the bore of the one larger LED openings 112 would be configured to control the viewing angles of the entire pixel 108 (i.e., of all the LEDs 106 in the pixel 108) rather than the viewing angles of an individual LED 106.

In an example, the horizontal viewing angle $\theta_{Horiz}$ that is provided for by the horizontal portions 116 of the bores 114 is from about 20° to about 40°, such as about 30°. In an example, the vertical viewing angle $\theta_{Vert}$ that is provided for by the vertical portions 118 of the bores 114 is from about 15° to about 30°, such as about 20°. Those of skill in the art will appreciate that these specific angles are being listed merely as examples, and that considerable variation in the angles recited herein are possible without varying from the scope of the invention.

In some examples, the horizontal viewing angle $\theta_{Horiz}$ or vertical viewing angle $\theta_{Vert}$, or both, are selected so that the display module 102 will meet viewing angle standards that are required for many applications that the display modules 102 are useful for including, but not limited to, transportation (i.e., road sign) applications. For example, the horizontal portions 116 of the bores 114 around the LED openings 112 can allow a transportation information display that includes the face cover 100 to meet transportation industry standards for the horizontal viewing angle, such as the portions of the EN 12966 standard established by the European Commission for Variable Message Traffic Signs relating to horizontal viewing angle $\theta_{Horiz}$, or those by the National Electrical Manufacturers Association (NEMA) for Dynamic Message Signs in the United States. Similarly, the vertical portions 118 of the bores 114 around the LED openings 112 can allow the transportation information display to meet the same transportation industry standards for the vertical viewing angle $\theta_{Vert}$.

Channels

In an example, best seen in FIGS. 3-5 and 7, each mogul 110 is surrounded by corresponding sets of one or more first channels in a first direction and one or more second channels in a second direction. In some examples, the first direction of the one or more first channels is generally perpendicular to the second direction of the one or more second channels. For example, as shown in FIG. 3, the first channels can be a set of one or more horizontal channels 120 that extend along the face cover 100 in a horizontal or substantially horizontal direction, and the second channels can be a set of one or more vertical channels 122 that extend in a vertical or substantially vertical direction. As will be described in more detail below, in some examples one or more of the horizontal channels 120 and the vertical channels 122 correspond to one or more support ribs 124 that are formed on the back side of the face cover 100 (shown in FIGS. 4, 5, 8A, and 8B), which help give structural integrity (such as rigidity) to the face cover 100 (as described in more detail below). The horizontal channel 120 and the vertical channels 122 also provide for water drainage along the display, such as rain water or water from melting snow or ice that had accumulated on the display. In some examples, one or both of the horizontal channels 120 and the vertical channels 122 help to direct or channel the water around the pixels 108 and away from the LED openings 112 and the LEDs 106 so that the water does not interfere with or alter the light being emitted from the LEDs 106, and thus does not block or distort the image or message content that is intended to be displayed. In an example, the horizontal channels 120 and the vertical channels 122 are also configured so that light that shines on the face of the display, such as sunlight, will be reflected away from the pixel, such as by bouncing off of one or more side surfaces 126 of the vertical channel 122 and off of a bottom surface 128 and a top surface 130 of the horizontal channel 120 to further dissipate the light and provide for enhanced contrast for the display.

In an example, the surfaces 126 that form the lateral side boundaries of the vertical channel 122 (which are the same as a side surface 126 of a first mogul 110 on a first side of the vertical channel 122 and a corresponding side surface 126 of a second mogul 110 on an opposite second side of the vertical channel 122) are both planar or substantially planar and form an angle with each other, referred to hereinafter as the "vertical channel angle $\varphi_{Vert}$"). In some examples, the vertical channel angle $\varphi_{Vert}$ is selected so that so that the vertical channel 122 is large enough to provide for adequate flow of water or debris through the channel when needed.

The vertical channel angle $\varphi_{Vert}$ can also be selected to provide for optimum or improved light contrast from the display module 102 during operation. The specific value of the vertical channel angle $\varphi_{Vert}$ that provides for improved or optimal contrast can depend on many factors, including the angle of Incidence of light on the face cover 100 (i.e., what direction is external light expected to come from), type of incident light (i.e., sunshine vs. man-made light, time of year (for sunshine), and from what direction the light is coming), and the material of the face cover 100 (including any coating, paint, or other covering materials that is applied to the face cover 100) that can affect how the side surfaces of the vertical channel 122 will reflect light.

Figure 4:
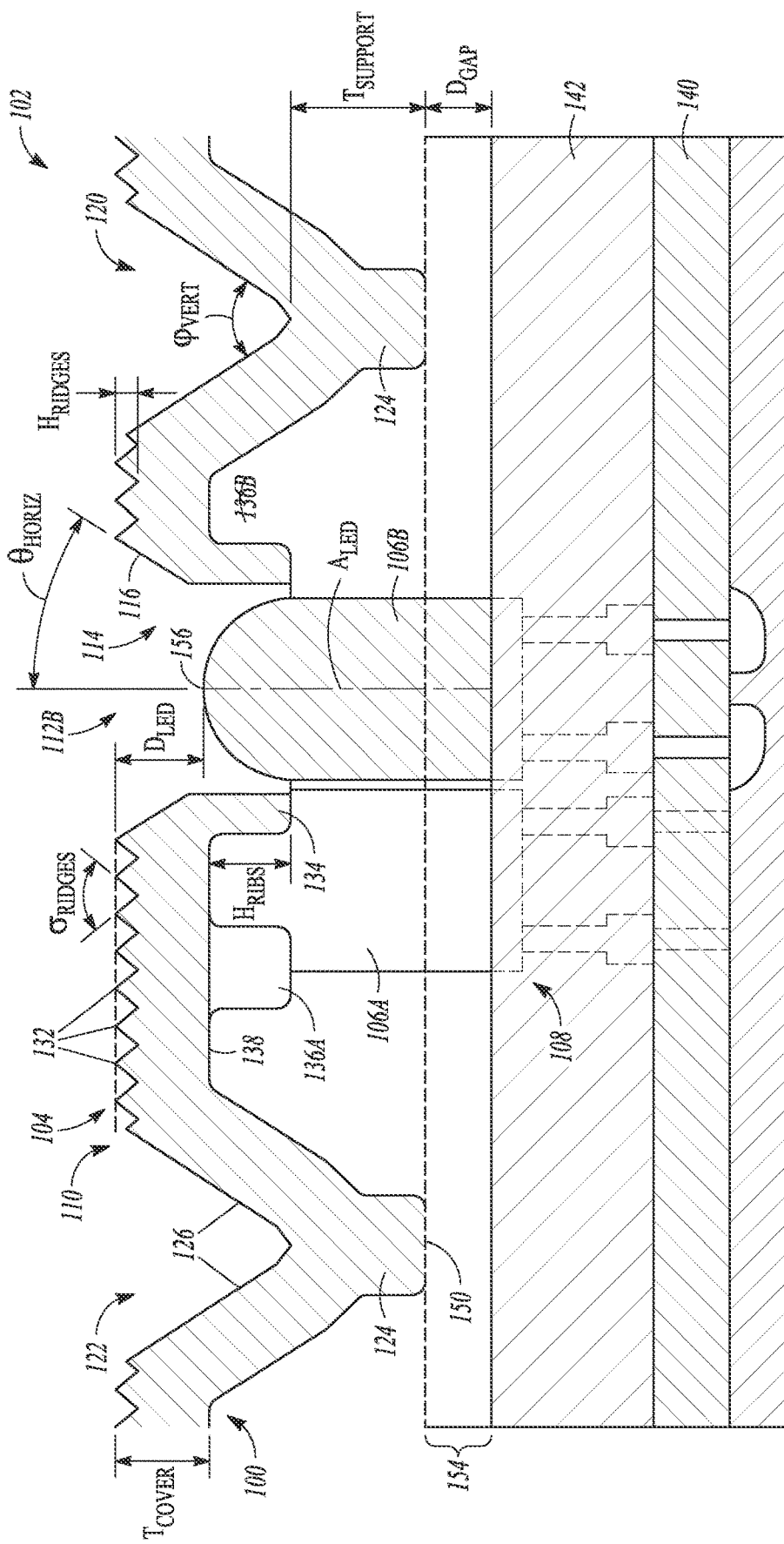
FIG. 4 is a vertical sectional view of the example face cover taken along line 4-4 in FIG. 3.

In an example, the vertical channel angle $\varphi_{Vert}$ is symmetric about a vertical plane normal to the overall plane of the face cover 100 (i.e., the portion of the vertical channel angle $\varphi_{Vert}$ on either side, e.g., left and right of center in FIG. 4, are equal such that the vertical channel 122 is symmetrical about a vertical direction). In an example, the total of the vertical channel angle $\varphi_{Vert}$ is from about 45° to about 80°, such as from about 50° to about 75°, for example from about 60° to about 70°, such as about 65°. Those of skill in the art will appreciate that these specific angles for the vertical channel angle $\varphi_{Vert}$ are being listed merely as an example, and that considerable variation in the angles recited herein are possible without varying from the scope of the invention.

In an example, a surface 128 that forms a bottom boundary of the horizontal channel 120 is the same as a top surface 128 of the mogul 110 below the horizontal channel 120, and will hereinafter be referred to as the "horizontal channel bottom surface 128" or the "mogul top surface 128"). In some example, the horizontal channel bottom surface 128 is planar or substantially planar and forms and is angled vertically downward relative to a horizontal plane that is normal to the front face of the face cover 100 by an angle $\varphi_{Bottom}$ (hereinafter referred to as the "channel bottom angle $\varphi_{Bottom}$"), as shown in FIG. 5. Similarly, in an example, a surface 130 that forms a top boundary of the horizontal channel 120 is the same as a bottom surface 130 of the mogul 110 above the horizontal channel 120 (hereinafter referred to as the "horizontal channel top surface 130" or the "mogul bottom surface 130". In some examples, the horizontal channel top surface 130 is planar or substantially planar and is angled vertically upward from the same horizontal plane by an angle $\phi_{Top}$ (hereinafter referred to as the "channel top angle $\phi_{Top}$"), as shown in FIG. 5.

In an example, the channel bottom angle $\phi_{Bottom}$ and the channel top angle $\phi_{Top}$ are asymmetric (i.e., the Channel Top Angle and the channel bottom angle $\phi_{Bottom}$ are not equal), such as with the channel bottom angle $\phi_{Bottom}$ being larger than the channel top angle $\phi_{Top}$ as shown in FIG. 5. In an example, also shown in FIG. 5, the channel bottom angle $\phi_{Bottom}$ is substantially larger than the channel top angle $\phi_{Top}$, such as with the channel bottom angle $\phi_{Bottom}$ being at least 10° larger than the channel top angle $\phi_{Top}$, and in some examples at least 15° larger, such as at least 20° larger, for example at least 25° larger, such as 26° larger or more In an example, the channel top angle $\phi_{Top}$ is no more than about 15°, such as no more than about 10°, for example no more than about 7.5°, such as no more than about 5°, and in an example is about 4° or less. In an example, the channel top angle $\phi_{Top}$ is from about 1° to about 15°, such as from about 2° to about 10°, for example from about 3° to about 5°, such as about 4°. In an example, the channel bottom angle $\phi_{Bottom}$ is at least about 15°, such as at least about 20°, for example at least about 25°, such as at least about 30°. In an example, the channel bottom angle $\phi_{Bottom}$ is from about 15° to about 45°, such as from about 20° to about 40°, for example from about 25° to about 35°, such as about 30°. Those of skill in the art will appreciate that these specific angles for the channel top angle $\phi_{Top}$ and the channel bottom angle $\phi_{Bottom}$ are being listed merely as an example, and that considerable variation in the angles recited herein are possible without varying from the scope of the invention.

Contrast Ridges

As can also be seen in FIGS. 3, 4, 6, 7 and 9, at least a portion of the front surfaces of the face cover 100 can include a plurality of contrast ridges 132. The contrast ridges 132 help to further diffuse incident light and to prevent or minimize glare from appearing due to the reflected light. This also helps to improve contrast between the LEDs 106 and the front surfaces of the face cover 100, which improves image performance in the display. The contrast ridges 132 can also help to hide seams between adjacent display modules 102 so that even at relatively close distances the full display will appear to be seamless and formed from a single large display.

In an example, best seen in FIGS. 3 and 7, the contrast ridges 132 comprise a plurality of elongated ridges 132 that extend in a first direction along a substantial portion of each mogul 110, and in some examples extend through the entirety or substantially the entirety of each mogul 110. In an example, the contrast ridges 132 extend generally in a vertical direction and extend along a substantial portion of the height of each mogul 110, and in some examples extend through the entire height or substantially the entire height of each mogul 110. In an example, the contrast ridges 132 comprise a generally saw-toothed configuration with repeating and alternating peaks and troughs that are spaced apart in a second direction that is generally perpendicular to the first direction. For example, if the contrast ridges 132 extend in the vertical direction, than the saw-toothed configuration can Include adjacent contrast ridges 132 being spaced apart in the horizontal direction. In some examples, the dimensions of the contrast ridges 132 are selected to provide for improved overall contrast between the LEDs 106 and the face cover 100 during operation. The specific dimensions used to provide for improved or optimal contrast can depend on many factors, which can include, but are not limited to, one or any combination of: the angle of incidence of light onto the face cover 100 (e.g., the direction from which external light is expected to come); the type of incident light (e.g., sunshine versus man-made light, or the time of year); and the material of the face cover 100 (including any coatings, paints, or other covering materials that may have been applied to the face cover 100) that can affect how the surfaces of the contrast ridges 132 will reflect or absorb light.

Several parameters of the contrast ridges 132 can affect the resulting contrast between the LEDs 106 and the face cover 100. For example, a height $H_{Ridges}$ of each contrast ridge 132 (e.g., the "elevation change" distance from the lowest point in a trough to the highest point of a peak, as best seen in FIG. 4) an affect the contrast between the LEDs 106 and the face cover. In an example, the ridge height $H_{Ridges}$ is selected to be from about 0.25 mm to about 1 mm, such as from about 0.4 mm to about 0.6 mm, for example about 0.5 mm. An angle $\delta_{Ridges}$ that is formed by the contrast ridges 132 (e.g., as shown in FIG. 4, the angle $\delta_{Ridges}$ between the right side of a first vertically-extending contrast ridge 132 and the left side of a second contrast ridge 132 that is Immediately adjacent to the first contrast ridge 132 on the right side of the first contrast ridge 132, where "left" and "right" refer to the directions as depicted in FIG. 4) can affect the contrast between the LEDs 106 and the face cover 100. In an example, the angle $\delta_{Ridges}$ is selected to be from about 60° to about 85°, such as from about 70° to about 80°, for example from about 75° to about 80°, such as about 77°. A distance from a point on one contrast ridge 132 to a correspondingly identical point on an adjacent contrast ridge 132 (such as from the peak of a first contrast ridge 132 to the peak of an immediately adjacent contrast ridge 132, as shown in FIG. 7, also referred to herein as the "peak-to-peak distance $D_{Ridges}$ of the contrast ridges 132," or simply the "peak-to-peak distance $D_{Ridges}$") can affect the contrast between the LEDs 106 and the face cover 100. In an example, the peak-to-peak distance $D_{Ridges}$ is selected to be from about 0.5 mm to about 1.5 mm, such as from about 0.6 mm to about 1 mm, for example from about 0.7 mm to about 0.9 mm, such as about 0.8 mm. Those of skill in the art will appreciate that these specific dimensions are being listed merely as an example, and that considerable variation in the dimensions and angles recited herein are possible without varying from the scope of the Invention.

Those of skill in the art will appreciate that in order to achieve the contrast improvement described above, the contrast ridges 132 need not be vertically extending ridges, but rather could extend in other directions. Those of skill in the art will also appreciate that the contrast ridges 132 need not extend across the entirety of the mogul 110. Moreover, those of skill in the art will appreciate that the face cover 100 could include some subset of contrast ridges 132 that extend in one direction over a portion of the mogul 110 and another subset of contrast ridges 132 that extend in a second direction over a different portion of the mogul 110. For example, one area of the mogul 110 could have a first set of contrast ridges 132 that extend generally vertically, as with the contrast ridges 132 shown in the figures, and a second area of the mogul 110 with a second set of ridges that extend generally horizontally or in another direction or directions entirely.

In an example, the face cover 100 with the contrast ridges 132 permits the display module 102 to meet contrast standards for many applications that the display modules 102 are useful for Including, but not limited to, transportation (e.g., road sign) applications. For example, the face cover 100 with contrast ridges 132 such as those described above can allow a transportation information display that includes the face cover 100 to meet transportation industry standards for contrast, such as the portions of the EN 12966 standard established by the European Commission for Variable Message Traffic Signs relating to contrast, or those by the National Electrical Manufacturers Association (NEMA) for Dynamic Message Signs in the United States.

Led Alignment

In some examples, the face cover 100 can provide alignment to the LEDs 106 so that the LEDs 106 are property aligned with respect to the LED openings 112 such that the light that is emitted from each LED 106 will be property directed from its corresponding LED openings 112. Alignment of the LEDs 106 can therefore prevent each LED 106 from Inadvertently directing too high of a proportion of their light into the Interior of the corresponding mogul 110 that surrounds the LED 106. In an example, the display module 102 includes one or more LED-alignment structures 134, 136A, 138B, and 136C (collectively referred to as "LED-alignment structures 134, 138" for brevity) that interact with the LEDs 106 to align them in a desired alignment, such as an alignment relative to the mogul 110 and/or the LED openings 112 in the face cover 100.

In some examples, the type of light-emitting elements (i.e., the LEDs 106) that are used in the display module 102 are so-called "through-hole" type light-emitting devices. The LEDs 106 depicted in FIGS. 4, 5, 6, and 9 are of the through-hole type of LED that each include an elongated or semi-elongated LED bulb with a rounded distal end. As will be appreciated by those in the art, the LED bulbs, and in particular the rounded distal ends, are designed to direct a large proportion of light that is generated by the LED 106 generally forward out of the rounded distal end (i.e., downward in the view shown in FIG. 4 and from left to right in the view shown in FIG. 5). Therefore, in some examples, the one or more LED-alignment structures 134, 136 provided with the display module 102 are configured so that the LED axis $A_{LED}$ (shown in FIGS. 4 and 5) is aligned so that it is normal or substantially normal to a plane formed by the LED openings 112 through the mogul 110, which in some examples is substantially the same plane as an interior back surface 138 of the mogul 110 (shown in FIGS. 4, 5, 8A, and 8B)

In an example, the one or more LED-alignment structures 134, 138 are formed as part of the face cover 100. In an example, best seen in FIGS. 8A and 8B, but also seen at least partially in FIGS. 4 and 5, the one or more LED-alignment structures 134, 136 are coupled to a rearward-facing surface of the face cover 100, such as the interior back surface 138 of each mogul 110. For example, the face cover 100 can be molded so that the one or more LED-alignment structures 134, 136 project from the back surface 138 of the face cover 100.

In the example shown in the figures, the one or more LED-alignment structures 134, 136 comprises a plurality of LED-alignment ribs 134, 136A, 136B, and 136C (collected referred to as "alignment ribs 134, 136" or simply as "ribs 134, 136") that project from the back surface 138 of the mogul 110 proximate to and at least partially surrounding a periphery of each LED opening 112 through the mogul 110. For example, the face cover 100 can be formed (e.g., by molding) so that the ribs 134, 136 protrude from the back surface 138 generally rearward in a front-to-back direction (e.g., the direction that is the same as the LED axis $A_{LED}$).

Figure 8A:
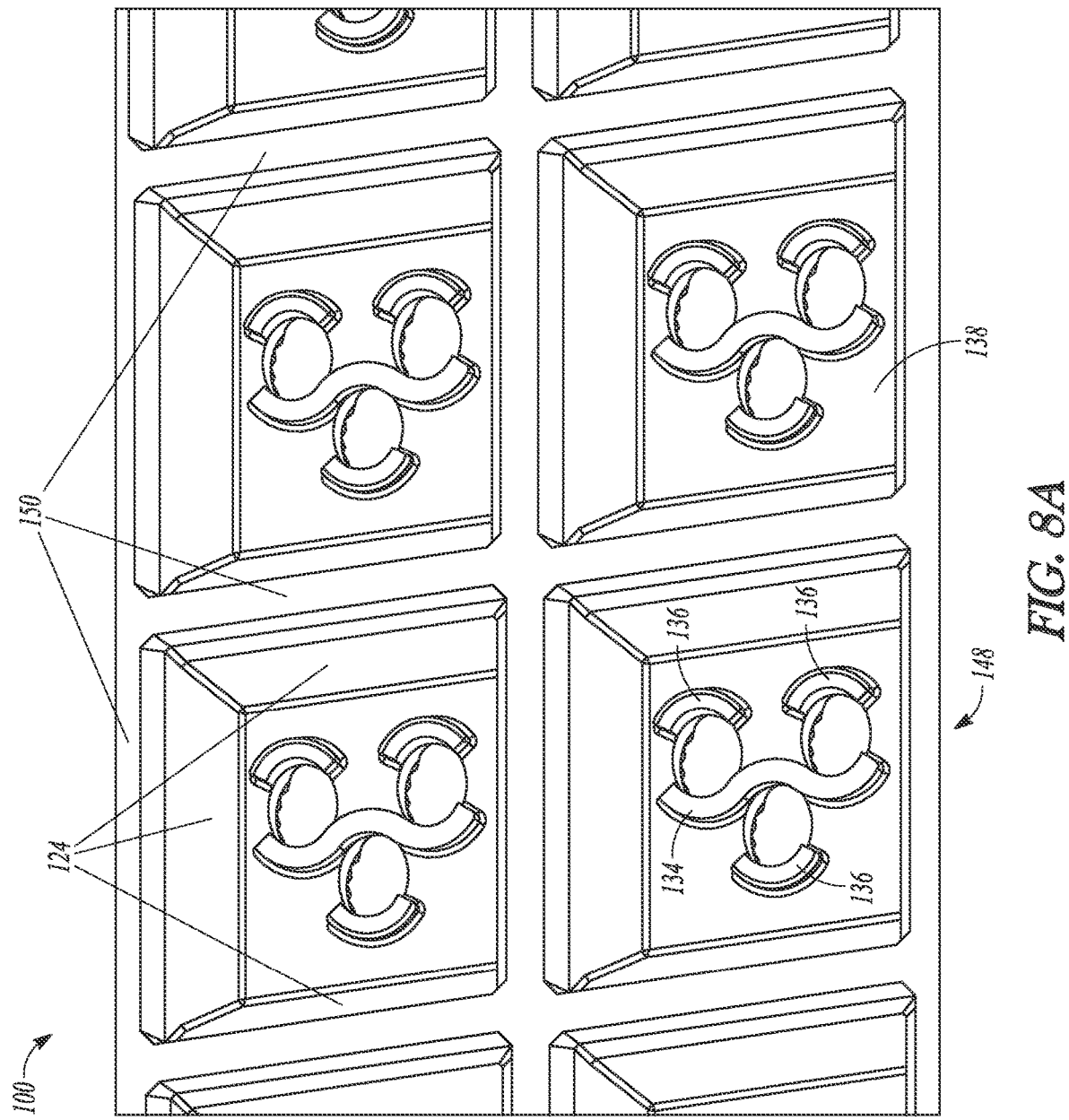
FIGS. 8A and 8B are rear perspective views of the example face cover of FIG. 3.
Figure 8B:
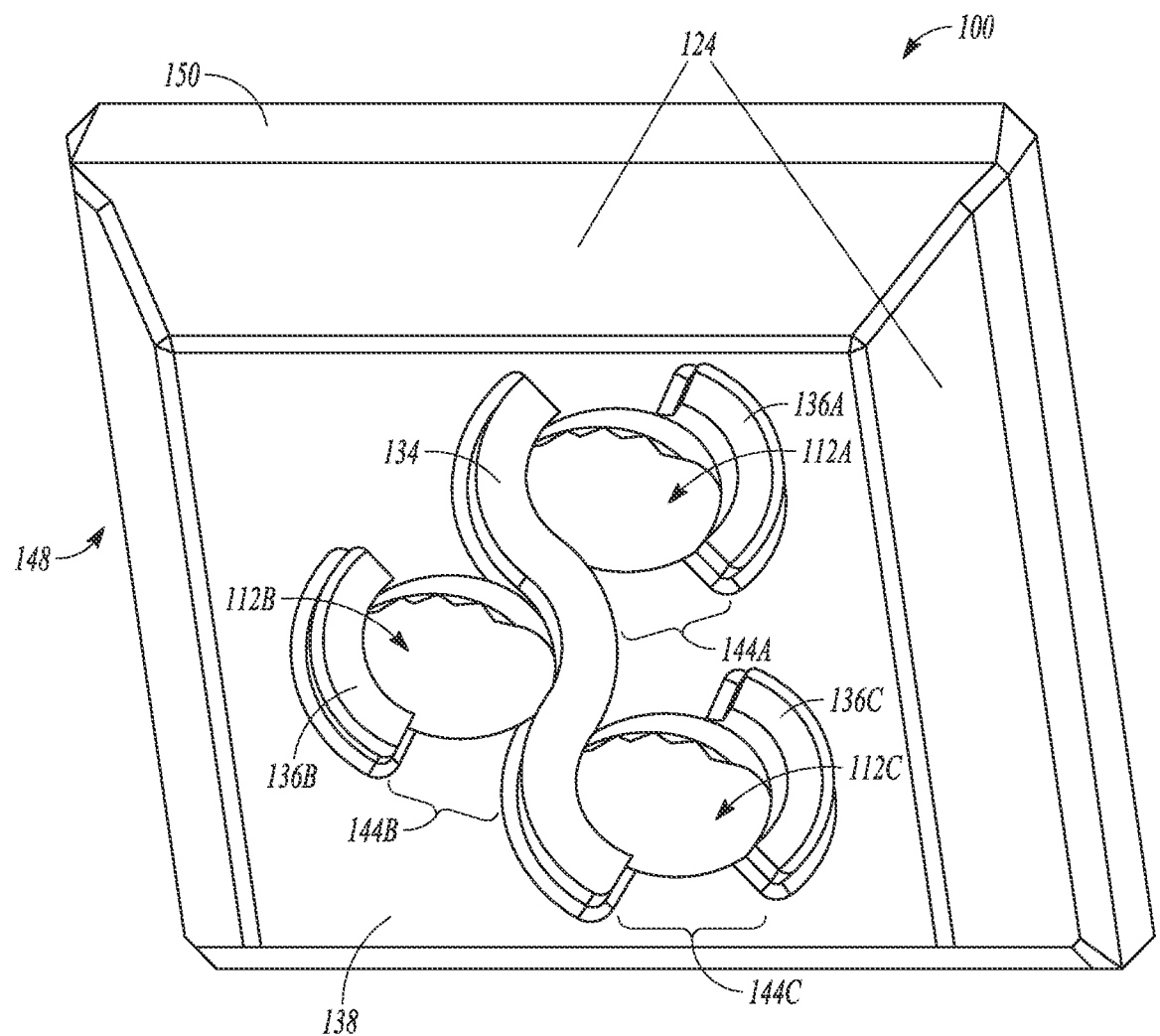

As can be best seen in FIG. 8B, in some examples the plurality of ribs 134, 136 includes at least one central alignment rib 134 that is positioned proximate to a lateral-interior side of each LED openings 112 within the pixel and at least one outside alignment rib 138A, 136B, 138C (collectively referred to as the "outside alignment rib 138" or "outside alignment ribs 138") proximate to each LED openings 112 on a laterally opposite side from the central alignment rib 134. In the example best seen in FIG. 8B, the outside alignment ribs 138 include a first outside alignment rib 136A position proximate to the first LED opening 112A, a second outside alignment rib 138B positioned proximate to the second LED opening 112B, and a third outside alignment rib 136C positioned proximate to the third LED opening 112C.

It will be appreciated that the one or more LED-alignment structures 134, 138 are not limited to the specific design, or even the general structural concepts of the ribs 134, 138 shown. Rather, so long as a structure in question provides substantially even alignment support so that the LED 106 is aligned in a desired alignment relative to the face cover 100, and in particular that aligns the LED 106 so that it is normal or substantially normal relative to its corresponding LED openings 112, that structure can be considered an "LED-alignment structure" for the purposes of the present disclosure.

Although the face cover 100 and the display module 102 are described and shown with the one or more LED-alignment structures being formed as part of the face cover 100, such as the alignment ribs 134, 138 formed as part of the mogul 110, the display module 102 is not so limited. For example, those of skill in the art can readily contemplate configurations of the LED-alignment structures that are formed as part of the circuit board 140 on which the LEDs 106 are mounted or that are connected to the circuit board 140, such as by forming the LED-alignment structures as part of a potting material 142 (also referred to as "potting 142"). In other examples, the LEDs 106 can be so-called "surface mounted" LEDs 106 that are soldiered to a front surface of the circuit board 140 such that the solder can act not only as the electrical connection for the LEDs 106 but also as an LED-alignment structure. In yet another example, the LED-alignment structure can be formed separate from the face cover 100, the circuit board 140, and the LEDs 106 and can be positioned between the circuit board 140 and the face cover 100 or coupled to another part of the face cover 100, such as inner surfaces corresponding to the support ribs 124 or an Interior surface of the side walls of the mogul 110 that bound the horizontal channel 120 or the vertical channel 122.

In an example, best seen in FIGS. 4, 5, 8A, and 8B, the ribs 134, 138 project from the back surface 138 of the mogul 110 by a sufficient distance so that they will provide for sufficient alignment of the LEDs 106. In an example, the height $H_{Ribs}$ of each rib 134, 138, e.g., the distance that the ribs 134, 138 protrude from the back surface 138 of the mogul 110, is at least about 0.5 millimeters (mm), such as at least about 1 mm, for example at least about 1.25 mm, such as at least about 1.5 mm, for example at least about 1.75 mm. In an example, the height $H_{Ribs}$ of each rib 134, 138 is from about 1 mm to about 3 mm, such as from about 1.25 mm to about 2.5 mm, for example from about 1.5 mm to about 2 mm, and in some examples the height $H_{Ribs}$ is about 1.7 mm. Those of skill in the art will appreciate that these specific dimensions for the alignment ribs 134, 136 are being listed merely as an example, and that considerable variation in the dimensions recited herein are possible without varying from the scope of the invention.

Water and Debris Drainage

As will be appreciated by those having skill in the art, displays that are designed for outdoor use will often come into contact with water or other debris. For example, transportation displays that are located above or beside a roadway will be subjected to weather, including rain, sleet, snow, or other precipitation. Dirt, dust, gravel, or other pieces of debris often find their way into contact with outdoor displays as well, for example because debris on a roadway is agitated by passing automobiles. In some examples in display modules according to the present disclosure, a very close tolerance may be specified between each LED 106 and the LED-alignment structures (e.g., the ribs 134, 136) in order to provide for the specified alignment of the LEDs 106 (e.g., for a specified directing of light from the LEDs 106, as described above). This very close tolerance can result in there being very little space between the edge or edges of the LED openings 112 and the alignment ribs 134. For example, in some designs of the face cover 100, the gap between each LED 106 and the alignment ribs 134, 136 can be on the order of a tenth of a millimeter (0.1 mm) or smaller. At such small gaps, the surface tension of water tends to make water flow difficult. These gaps can also be too small for some debris to be able to pass. Including larger dust particles. Depending on the material that forms it, dust particles typically range from about 0.5 micrometers (μm) (about $5 \times 10^{-4}$ mm) to about 100 μm (0.1 mm, roughly the same as the gaps between the alignment ribs 134, 136 and the LEDs 106), but can be as large as 500 μm (0.5 mm) or even as large as about 1000 μm (1 mm).

In order to counter this lack of spacing for water and debris drainage and removal, in some examples, the display module 102 includes one or more structures that provide for drainage of water or debris, or both. In an example, the one or more LED-alignment structures 134, 136 associated with each LED opening 112 include one or more drainage gaps 144A, 144B, 144C (shown in FIG. 8B and collectively referred to as the "drainage gaps 144" or simply "gaps 144") that provide space for drainage of water or debris, or both. Each drainage gap 144 includes a space in the alignment structure 134, 136 or between proximate alignment structures 134, 136. In an example, a corresponding drainage gap 144 is formed at or proximate to at least a portion of a bottom edge of each LED opening 112. For example, as shown in the example of FIG. 8B, a first drainage gap 144A is formed proximate to a bottom edge of the first LED opening 112A between the central alignment rib 134 and the first outside alignment rib 136A, a second drainage gap 144B is formed proximate to bottom edge of the second LED opening 112B between the central alignment rib 134 and the second outside alignment rib 136B, and a third drainage gap 144C is formed proximate to a bottom edge of the third LED opening 112C between the central alignment rib 134 and the third outside alignment rib 138C.

Each drainage gap 144 provides sufficient space for water or debris that may have built up in the corresponding LED opening 112 to drain down away from the LED openings 112 through the space formed by the drainage gap 144. The inclusion of the one or more drainage gaps 144 for each LED opening 112 provides sufficient space so that the surface tension of water will not prevent water from flowing away from the LEDs 106 through the drainage gaps 144. The space provided by the drainage gaps 144 can also allow more space for larger dust or other debris particles to pass away from the LEDs 106. In this way, the one or more drainage gaps 144 can prevent or minimize buildup of water or debris at the LED openings 112 that could otherwise block or distort of the light being emitted by the LEDs 106, which in turn would otherwise distort the textual, graphical, or video Information being displayed by the display module 102.

The inventors have also found that the contrast ridges 132 described above not only improve contrast of the face cover 100, but when they are included on at least the surfaces of the horizontal channel 120 (e.g., on the top surfaces 128 and the bottom surfaces 130 of the moguls 110), that the contrast ridges 132 also can prevent or reduce the formation and adherence of water droplets within the horizontal channels 120. This prevention or reduction in water droplet adherence in turn can prevent or reduce the accumulation of water or other debris on the face cover 100 compared to a comparable face cover 100 that did not include contrast ridges 132 in the horizontal channels 120. Without wishing to be bound by this theory, the inventors believe that this occurs because the inclusion of the contrast ridges 132 changes the water contact angle of the top surface of the mogul 110 to a value that is very difficult for water to physically achieve within the dimensions of the horizontal channel 120, at least with contrast ridges 132 formed with the ridge angle $\delta_{Ridges}$ described above.

Figure 6:
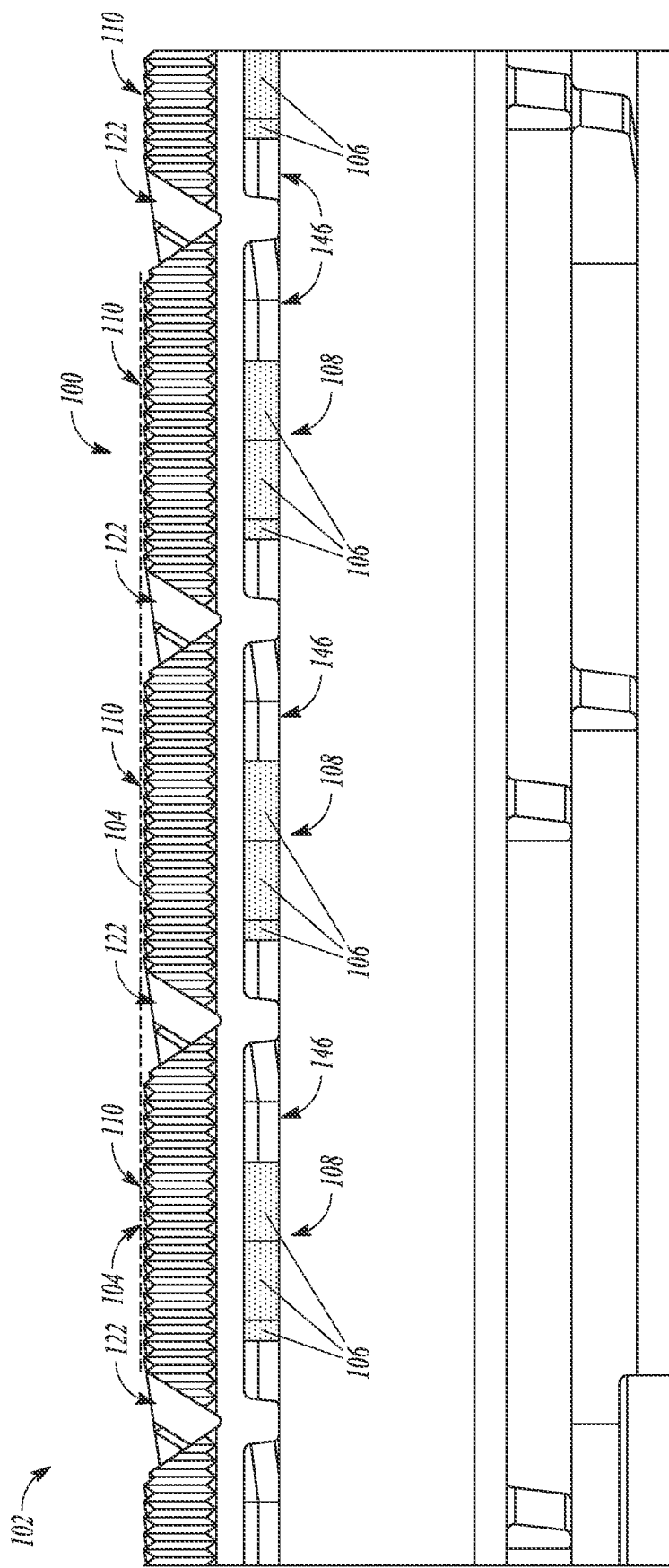
FIG. 6 is a bottom perspective view of an example display module with the example face cover of FIG. 3.

In an example, each mogul 110 can also include one or more drainage slots 148 or other drainage openings (shown in the bottom perspective view of FIG. 6). The one or more drainage slots 148 in each mogul 110 can allow water or other debris that may have gotten into the interior of the mogul 110, such as through the LED openings 112 and the Drainage Gaps or via condensation inside the mogul 110, to flow out of the bottom of the mogul 110. After flowing out of a drainage slot 146 in one mogul 110, the water or debris can flow into the horizontal channel 120 immediately below that mogul 110 and onto a Top Surface of the mogul 110 below it (for example as seen in FIG. 7). The water or debris could then flow around the mogul 110 and down the front of the face cover 100 in the vertical channels 122, or the water or debris could flow down the front of the mogul 110 below the original mogul 110 (such as down a front surface of that mogul 110, when may cause a portion of the water or debris to flow into one or more of the LED openings 112 of the lower mogul 110, through the drainage gaps 144 in the lower mogul 110, and out the drainage slot 146 of the lower mogul 110).

Impact Protection

As noted above, the face cover 100 can protect the LEDs 106 and other components of the display module 102 from being damaged if the front face 104 of the display module 102 is impacted by an object. For example, if the display module 102 is part of a transportation display, it is common for passing automobiles to agitate debris, including larger debris such as rocks, which may strike the front face 104. In some examples, the LEDs 106 are recessed within the face cover 100 (e.g., the LEDs 106 do not protrude from the LED openings 112 at all), which can be sufficient to protect the LEDs 106 and the rest of the display module 102 from damage due to impact from relatively small particles or particles that impact the front face 104 at relatively slow speeds. In some examples the face cover 100 can include one or more additional features to protect the LEDs 106 and other components of the display module 102 from particularly large objects or from objects moving a high rate of speed when impact occurs, or both.

In some examples, the material that is used to form the face cover 100 can be particularly resilient and resistant to impact. In an example, the face cover 100 comprises a polycarbonate-based material that is capable of absorbing relatively large impact forces without breaking or cracking. In some examples, the face cover 100 comprises a high-density polycarbonate that has high impact strength. However, other materials with high impact strength can also be used. In an example, the material that forms the face cover 100 has an impact strength of at least about 500 joules per meter of thickness of the material (J/m), for example at least about 510 J/m, such as at least about 520 J/m, for example at least about 530 J/m, such as at least about 540 J/m, for example at least about 550 J/m, such as at least about 560 J/m, for example at least about 570 J/m, such as at least about 575 J/m, for example at least about 580 J/m, such as at least about 590 J/m, such as at least about 600 J/m, for example at least about 605 J/m, such as at least about 610 J/m, for example at least about 615 J/m, such as at least about 620 J/m, for example at least about 625 J/m, such as at least about 630 J/m, for example at least about 635 J/m, such as at least about 640 J/m.

The thickness of the face cover 100, particularly the thickness $T_{Cover}$ of the portion of the moguls 110 in front of the LEDs 106, can be selected to provide for the desired or specified impact resistance. The thickness $T_{Cover}$ of the face cover 100 that is selected can depend on many factors including, but not limited to, one or any combination of the following: the impact forces that the face cover 100 is being designed to withstand (which in turn may depend on industry standards for the application in which the display module 102 is to be used, for example the EN 12968 standard for Variable Message Traffic Signs); the actual impact forces that the display module 102 is expected to experience (if it is different than an industry standard for the application of the display module 102, such as if there is not industry standard or if the display module 102 is being designed to exceed the standard); the material that is selected to be used for the face cover 100; and other materials or structures within the display module 102 that may Interact with the face cover 100 to absorb or dissipate forces from an impact. In an example where the face cover 100 is made from a high-density polycarbonate material, the thickness $T_{Cover}$ of the face cover 100, either the general thickness throughout the area of the face cover 100 or at least the thickness of the portions of the moguls 110 that are in front of the LEDs 106 (also referred to as the "front face of the mogul 110), is at least about 1 millimeter (mm), such as at least about 1.25 mm, for example at least about 1.5 mm, such as at least about 1.75 mm, for example at least about 1.85 mm, such as at least about 1.9 mm, for example at least about 2 mm. In an example, the thickness $T_{Cover}$ of the face cover 100 (at least at the front face of the mogul 110) is from about 1.5 mm to about 2.5 mm, such as from about 1.75 mm to about 2 mm, for example about 1.85 mm. Those of skin in the art will appreciate that these specific thicknesses $T_{Cover}$ for the face cover 100 (such as at the moguls 110) are being listed merely as an example, and that considerable variation in the thicknesses recited herein are possible without varying from the scope of the invention.

In an example, the face cover 100 can be formed so that it includes one or more support structures that can enhance one or more mechanical properties of the material of the face cover 100 and improve overall impact resistance of the face cover 100. In an example, the one or more support structures include a plurality of support ribs 124 (shown in FIGS. 4, 5, 8A, and 8B) that project from a face of the face cover 100.

In an example, the one or more support structures, such as the one or more support ribs 124. Improve one or more of the following properties of the face cover 100; impact strength (e.g., the impact force that the face cover 100 can withstand before breaking), and rigidity (e.g., the ability to withstand flexing or bending forces without breaking). In the example best seen in FIGS. 8A and 8B, the support ribs 124 project from a rear face 148 of the face cover 100. In an example, the support ribs 124 are included in a regular pattern throughout a substantial portion of the rear face 148 of the face cover 100. In the example shown, the support ribs 124 protrude from the rear face 148 at substantially the same positions on the face cover 100 as the horizontal channels 120 and the vertical channels 122, but with the channels 120, 122 being on the front side of the face cover 100 and the support ribs 124 protruding from the rear face 148 on the back side of the face cover 100. The regular pattern of the support ribs 124, particular a regular pattern of elongate ribs 124 that extend along large portions of the face cover 100, have been found to provide improved impact resistance compared to a comparable face cover 100 where the support ribs 124 are not included. Although not wishing to be bound by any theory, the inventors believe that the network of support ribs 124 that is formed on the face cover 100 helps to dissipate forces associated with an impact against the front surface of the face cover 100. In particular, when the support ribs 124 are included in a large grid-like pattern on a back surface of the face cover 100, they were found to be particularly effective in impact resistance without breaking compared to a comparable face cover 100 that did not Include the support ribs 124.

In an example, the face cover 100 is thicker at positions where the support ribs 124 are located than it is throughout the rest of the face cover 100. In other words, a total thickness of the face cover 100 where a support rib 124 is located (also referred to as the "support thickness $T_{Support}$") is greater than the thickness $T_{Cover}$ throughout the rest of the face cover 100, such as the thickness $T_{Cover}$ at the front face of the moguls 110. In an example, the support thickness $T_{Support}$ at the support ribs 124 is at least 1.5 times the thickness $T_{Cover}$ of other portions of the face cover 100, for example at least about 1.75 times the thickness of the other portions, such as at least about 2 times the thickness of the other portions. In an example where the face cover 100 is made from a polycarbonate material, the support thickness $T_{Support}$ at the support ribs 124 is at least about 1.5 mm, such as at least about 1.85 mm, for example at least about 2 mm, such as at least about 2.5 mm, for example at least about 3 mm, such as at least about 3.5 mm, for example at least about 4 mm or more. Those of skill in the art will appreciate that these specific thicknesses at the support ribs 124 are being listed merely as an example, and that considerable variation in the thicknesses recited herein are possible without varying from the scope of the invention.

In an example, the support ribs 124 project from the face cover 100 so that a back end 150 of the support ribs 124 are in close proximity to the potting material 142 that has been deposited on the circuit board 140 to which the LEDs 106 are mounted (as shown in FIGS. 4 and 5), which is also referred to herein simply as the "potting 142." In some examples the potting 142 can be a mechanically resilient or partially mechanical resilient material that can also absorb and dissipate energy from an Impact. In some examples, the display module 102 can include one or more dampening structures 152, referred to as dampers 152 (shown only in FIG. 5), that protrude forward from the potting 142. In an examples where dampers 152 are included, each damper 152 is aligned with and positioned proximate to a position where a corresponding support rib 124 is expected to be deflected if the display module 102 were impacted at that location. In an example, one or more of the dampers 152 are sized and positioned so that the rear end 150 of the corresponding support rib 124 is in contact with the damper 152, as shown in FIG. 5. In other examples, one or all of the dampers 152 can be positioned at locations that are spaced from the support ribs 124 (or in examples where the face cover 100 does not include support ribs) so that dampers 152 come into contact with some other structure of the face cover 100, such as the interior back surface 138 of the mogul 110.

In examples that include one or more dampers 152, when the front face 104 of the display module 102 is impacted and the face cover 100, one or more support ribs 124 can contact one or more corresponding dampers 152 such that the one or more dampers 152 can dissipate at least a portion of the impact energy (described in more detail below). In some examples, the one or more dampers 152 can be formed from the same material as the potting 142, or the one or more dampers 152 can be made from a different material that is specifically selected for its force dampening and dissipating properties, such as a rubber or other resilient or springy material.

In some examples, when an object Impacts the face cover 100, it can cause at least a portion of the face cover 100 to be deflected rearward toward the circuit board 140. In some examples, the face cover 100 is sized and positioned so that there is an air gap 154 between the face cover 100 and the potting 142 (as shown in FIG. 4) or between the face cover 100 and a damper 152 (not shown). In some examples, the depth of the air gap 154 or the distance of the air gap 154 (both also referred to the "$D_{Gap}$") is small, e.g., so that the support ribs 124 are close to the potting 142 or to one or more of the dampers 152 without actually touching it (as shown in FIG. 4). In such an arrangement, rearward deflection of the face cover 100 after impact causes the rear-most point or points of the face cover 100 (e.g., the rear end 150 of the support ribs 124) to close the distance $D_{Gap}$ of the air gap 154 and contact the potting 142 or a damper 152. In some examples, the rearward deflection is more than the depth $D_{Gap}$ of the air gap 154, which causes the face cover 100 to push into and deflect or otherwise deform the potting 142 or the damper 152, which can further absorb and dissipate energy from the impact over the wider area of the potting 142 or the circuit board 140, such as via the deformation of the damper 152 or the potting 142 or by transmission of at least a portion of the Impact energy to another structure (e.g., the dampers 152 can transmit at least a portion of the impact energy to the potting 142, or the potting 142 can transmit at least a portion of the impact energy to the circuit board 140 or to another structure, or both).

In some examples, the depth $D_{Gap}$ of the air gap 154 is smaller than the depth of the spacing between a distal tip 158 of the LED 106 and the front-most point or points of the face cover 100 (also referred to as the "$D_{LED}$"), as shown in FIG. 4. In such examples, rearward deflection of the face cover 100 will cause the rear-most point or points of the face cover 100 (e.g., the rear end 150 of support ribs 124) to close the air gap 154 and come into contact with the potting 142 or damper 152 before the face cover 100 has deflected rearward far enough so that the distal tip 158 of the LED 108 begins to project out of the LED opening 112 and beyond the front-most points or surfaces of the face cover 100 (e.g., the peaks of the contrast ridges 132). In this way, the face cover 100 prevents or minimizes the likelihood of damage to the LEDs 106 because the LEDs 106 will not be exposed to potential impact from an object striking the display. In other words, the face cover 100 includes structures (e.g., one or more of the support ribs 124, potting 142, and dampers 152) that transfer at least a portion of the impact forces from the face cover 100 to structures in the display module 102 rather than the Impact forces being exerted on components of the display module 102 that can be damaged by those forces, such as the LEDs 106 or other supporting electronics. For example, the face cover 100 can receive impact energy from an object striking the front face 104 of the display module 102 and can absorb that impact energy into the material of the face cover 100 itself, which can then cause at least a portion of the face cover 100 to move, such as by being deflected rearward at or proximate to the point of impact. This movement can cause the rear-most point or points of the face cover 100 (such as the rear end 150 of the support ribs 124) to contact the potting 142 or the one or more dampers 152, where the impact energy can be further absorbed and dissipated.

Those of skill in the art will appreciate that the supporting structures are not limited to the specific form of the support ribs 124 shown in the figures. Rather, other structures can be contemplated that also provide for improved impact resistance for the face cover 100, such as by giving the face cover 100 more structural integrity or rigidity, forming other structures (either as part of the face cover 100 or separately from the face cover 100) that more effectively or efficiently dissipate impact forces throughout the face cover 100; or by including structures that transfer the impact forces from the face cover 100 to other structures, such as the potting 142 or one or more dampers 152.

In an example, the face cover 100 with the support ribs 124, and in some examples with the support ribs 124 and the one or more dampers 152, permits the display module 102 to meet impact resistance standards that are required for many applications that the display modules 102 would be useful for, including, but not limited to, transportation (i.e., road sign) applications. For example, examples of the face cover 100 that include support ribs 124 with or without the one or more dampers 152, such as those described above, can allow a transportation information display using that face cover 100 to meet impact standards for the transportation industry, such as the portions of the EN 12968 standard established by the European Commission for Variable Message Traffic Signs relating to impact standards, or the standards established by the National Electrical Manufacturers Association (NEMA) for Dynamic Message Signs in the United States.

In an example, the face cover 100 is configured so that it will withstand an impact energy that is at or below a specified impact threshold, such as those defined by the EN 12966 standard or an NEMA standard Dynamic Message Sign standard. The face cover 100 can be configured to meet the specified impact threshold by being configured with one or any combination of the following configuration options: (a) being made from a material having a specified impact strength (such as the example impact strengths described above for the face cover material); (b) with one or more portions or the face cover 100 having a specified thickness, such as the example thicknesses described above; (c) the face cover 100 having a specified flexibility when impacted so that the face cover 100 will bend of flex by a specified amount (or less) rather than crack or otherwise break when impacted; (d) the face cover 100 including support ribs such as the example support ribs 124 described above; (e) the display module 102 including one or more dampening structures to absorb at least a portion of the impact energy such as the example dampers 152 or the example potting material 142 described above. Those with skill in the art will understand that the specific choice for each configuration option and combination of configuration options can be modified from the values and choices described herein, such as by modifying one or more of the other configuration options to account for the difference in the modified configuration option.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. The Abstract is submitted with the understanding that it will not be used to interpret or limit the scope or meaning of the claims. Also. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A display module comprising:
a circuit board;
a plurality of light-emitting elements mounted to a display face of the circuit board;
wherein the plurality of light-emitting elements are grouped into a plurality of pixels each comprising a grouping of two or more of the plurality of light-emitting elements, wherein the pixels are configured to display one or more of textual, graphical, or video information;
a face cover coupled to the circuit board and positioned in front of at least a portion of the display face, the face cover comprising:
a plurality of openings through the face cover, wherein each opening is positioned proximate to a corresponding light-emitting element of a corresponding one of the plurality of pixels to permit light emitted from the corresponding light-emitting element of the corresponding pixel to pass through the face cover; and
a plurality of bores in the face cover, each bore surrounding at least a portion of a corresponding one of the plurality of openings, wherein each bore comprises at least one beveled portion to control a viewing angle of light that is emitted from the corresponding light-emitting element through the corresponding opening in at least one direction relative to the corresponding opening.

2. The display module of claim 1, wherein the at least one beveled portion is beveled at a bevel angle that corresponds to the viewing angle in the at least one direction.

3. The display module of claim 1, wherein the at least one beveled portion of each bore comprises a first beveled portion positioned in a first direction relative to the corresponding opening and a second beveled portion positioned in a second direction relative to the corresponding opening, wherein the first beveled portion is beveled at a first bevel angle corresponding to a first viewing angle for the first direction and the second beveled portion is beveled at a second bevel angle corresponding to a second viewing angle for the second direction.

4. The display module of claim 3, wherein the second direction is perpendicular or substantially perpendicular to the first direction.

5. The display module of claim 3, wherein the first direction is horizontal or substantially horizontal and the second direction is vertical or substantially vertical.

6. The display module of claim 1, wherein the face cover comprises one or more alignment structures for each corresponding pixel to align the light-emitting elements in a specified orientation relative to one or more of the openings for the corresponding pixel.

7. A display module comprising:
a circuit board;
a plurality of light-emitting elements mounted to a display face of the circuit board;
wherein the plurality of light-emitting elements are grouped into a plurality of pixels each comprising a first corresponding light-emitting element and a second corresponding light-emitting element, wherein the pixels are configured to display one or more of textual, graphical, or video information;
a face cover coupled to the circuit board and positioned in front of at least a portion of the display face, the face cover comprising:

a plurality of sets of openings through the face cover, wherein each set openings comprises a first corresponding opening positioned proximate to the first corresponding light-emitting element to permit light emitted from the first corresponding light-emitting element to pass through the face cover and a second corresponding opening positioned proximate to the second corresponding light-emitting element to permit light emitted from the second corresponding light-emitting element to pass through the face cover; and a set of bores in the face cover corresponding to each of the openings, wherein each set of bores comprises a first corresponding bore surrounding at least a portion of the first corresponding opening and a second corresponding bore surrounding at least a portion of the second corresponding opening, wherein the first corresponding bore comprises a first beveled portion positioned in a first direction relative to the first corresponding opening to control a first viewing angle of the light emitted from the first corresponding light-emitting element in the first direction, and wherein the second corresponding bore comprises a second beveled portion positioned in a second direction relative to the second corresponding opening to control a second viewing angle of the light emitted from the second corresponding light-emitting element in the second direction.

8. The display module of claim 7, wherein the light emitted from the first corresponding light-emitting element is of a first color and the light emitted from the second corresponding light-emitting element is of a second color.

9. The display module of claim 7, wherein each pixel further comprises a third corresponding light-emitting element, wherein each set of openings further comprises a third corresponding opening positioned proximate to the third corresponding light-emitting element to permit light emitted from the first corresponding light-emitting element to pass through the face cover, and wherein each set of bores further comprises a third corresponding bore surrounding at least a portion of the third corresponding opening, wherein the third corresponding bore comprises a third beveled portion positioned in a third direction relative to the third corresponding opening to control a third viewing angle of the light emitted from the third corresponding light-emitting element in the third direction.

10. The display module of claim 9, wherein the light emitted from the first corresponding light-emitting element is of a first color, the light emitted from the second corresponding light-emitting element is of a second color, and the light emitted from the third corresponding light-emitting element is of a third color.

11. The display module of claim 7, wherein the first viewing angle is different than the second viewing angle.

12. The display module of claim 7, wherein the first corresponding bore further comprises a third beveled portion in a third direction relative to the first corresponding opening to control a third viewing angle of the light emitted from the first corresponding light-emitting element in the third direction.

13. The display module of claim 12, wherein the third direction is perpendicular or substantially perpendicular to the first direction.

14. The display module of claim 12, wherein the first direction is horizontal or substantially horizontal and the third direction is vertical or substantially vertical.

15. The display module of claim 12, wherein the third viewing angle is different than the first viewing angle.

16. The display module of claim 12, wherein the second corresponding bore further comprises a fourth beveled portion in a fourth direction relative to the second corresponding opening to control a fourth viewing angle of the light emitted from the second corresponding light-emitting element in the fourth direction.

17. The display module of claim 16, wherein the fourth direction is perpendicular or substantially perpendicular to the second direction.

18. The display module of claim 16, wherein the second direction is horizontal or substantially horizontal and the fourth direction is vertical or substantially vertical.

19. The display module of claim 16, wherein the fourth viewing angle is different than the second viewing angle.

20. The display module of claim 7, wherein the face cover comprises one or more alignment structures corresponding to each set of openings to align the first corresponding light-emitting element in a specified orientation relative to the first corresponding opening and to align the second corresponding light-emitting element in a specified orientation relative to the second corresponding opening.

* * * * *